United States Patent
Reyes Lozano

(10) Patent No.: US 11,842,219 B2
(45) Date of Patent: Dec. 12, 2023

(54) AUTOMATIC IDENTIFICATION OF COMPUTER AGENTS FOR THROTTLING

(71) Applicant: EMC IP Holding Company LLC, Hopkinton, MA (US)

(72) Inventor: Leo Hendrik Reyes Lozano, Lynnwood, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 383 days.

(21) Appl. No.: 17/193,963

(22) Filed: Mar. 5, 2021

(65) Prior Publication Data

US 2022/0283874 A1    Sep. 8, 2022

(51) Int. Cl.
| | | |
|---|---|---|
| *G06F 9/50* | (2006.01) | |
| *G06F 9/48* | (2006.01) | |
| *G06F 11/34* | (2006.01) | |
| *G06F 11/30* | (2006.01) | |
| *G06N 20/00* | (2019.01) | |

(52) U.S. Cl.
CPC .......... *G06F 9/5038* (2013.01); *G06F 9/4881* (2013.01); *G06F 9/505* (2013.01); *G06F 9/5077* (2013.01); *G06N 20/00* (2019.01); *G06F 11/30* (2013.01); *G06F 11/34* (2013.01); *G06F 2209/504* (2013.01); *G06F 2209/5021* (2013.01)

(58) Field of Classification Search
None
See application file for complete search history.

(56) References Cited

U.S. PATENT DOCUMENTS

| | | | |
|---|---|---|---|
| 2003/0125900 A1* | 7/2003 | Orenstien | G06F 1/3203 702/132 |
| 2010/0241760 A1* | 9/2010 | Zhang | H04L 43/16 709/235 |
| 2019/0235890 A1* | 8/2019 | Schnoor | G06F 13/4068 |

\* cited by examiner

*Primary Examiner* — Qing Yuan Wu
(74) *Attorney, Agent, or Firm* — Amin, Turocy & Watson, LLP

(57) ABSTRACT

Computer agents can be throttled individually. In an example, when a computer agent completes a work item, the computer agent reports this to a central component that maintains a vote value for that agent and that increases the respective vote value based on the completed work item. When the central component determines that system performance is sufficiently diminished, central component can throttle the performance of those computer agents having respective vote values above a predetermined threshold value.

20 Claims, 15 Drawing Sheets

AUTOMATIC IDENTIFICATION OF COMPUTER AGENTS FOR THROTTLING

BACKGROUND

Storage systems can provide access to computer data to clients computers across communication networks. Storage systems can facilitate data storage using file systems. Some file systems (such as a parallel distributed networked file system) can perform tasks to maintain a health of the file system. These tasks can include operations such as restoring node and drive free space balance, reclaiming leaked blocks, and rebuilding a redundant array of inexpensive disks (RAID).

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can initialize a voting value for a first computer agent of a group of computer agents. The system can receive an indication from the first computer agent that the first computer agent has completed processing a work item. The system can determine processing resources consumed by the first computer agent while processing the work item, determine a numerical value for the processing resources, and add the numerical value to the voting value to produce an updated voting value. The system can, in response to determining that performance of a device, on which the first computer agent operated, has degraded past a first defined performance threshold, throttle performance of members of the group of computer agents for which respective voting values are above a second defined threshold.

An example method can comprise receiving, from a first computer agent of a group of computer agents by a system comprising a processor, an indication that a work item has completed processing. The method can further comprise determining resources consumed by the first computer agent during the processing of the work item, determining a numerical value for the resources, and adding the numerical value to a voting value for the first computer agent to produce an updated voting value. The method can comprise, in response to determining that a performance of a device, on which the first computer agent operated, has degraded beyond a first predetermined performance threshold, throttling, by the system, performance of members of the group of computer agents with respective voting values above a second predetermined threshold.

An example non-transitory computer-readable medium can comprise instructions that, in response to execution, cause a system comprising a processor to perform operations. These operations can comprise receiving an indication of completing processing of a task from a computer agent of a group of computer agents. These operations can comprise determining computing resources by the computer agent in the course of the processing of the task, and adding a numerical value that corresponds to the computing resources to a voting value for the computer agent to produce an updated voting value. These operations can comprise, in response to determining that performance of a computer, with respect to which the computer agent operated, has degraded according to a degradation function based on a performance threshold, and, in further response to determining that the updated voting value satisfies a voting function based on a voting threshold, throttling performance of the computer agent.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
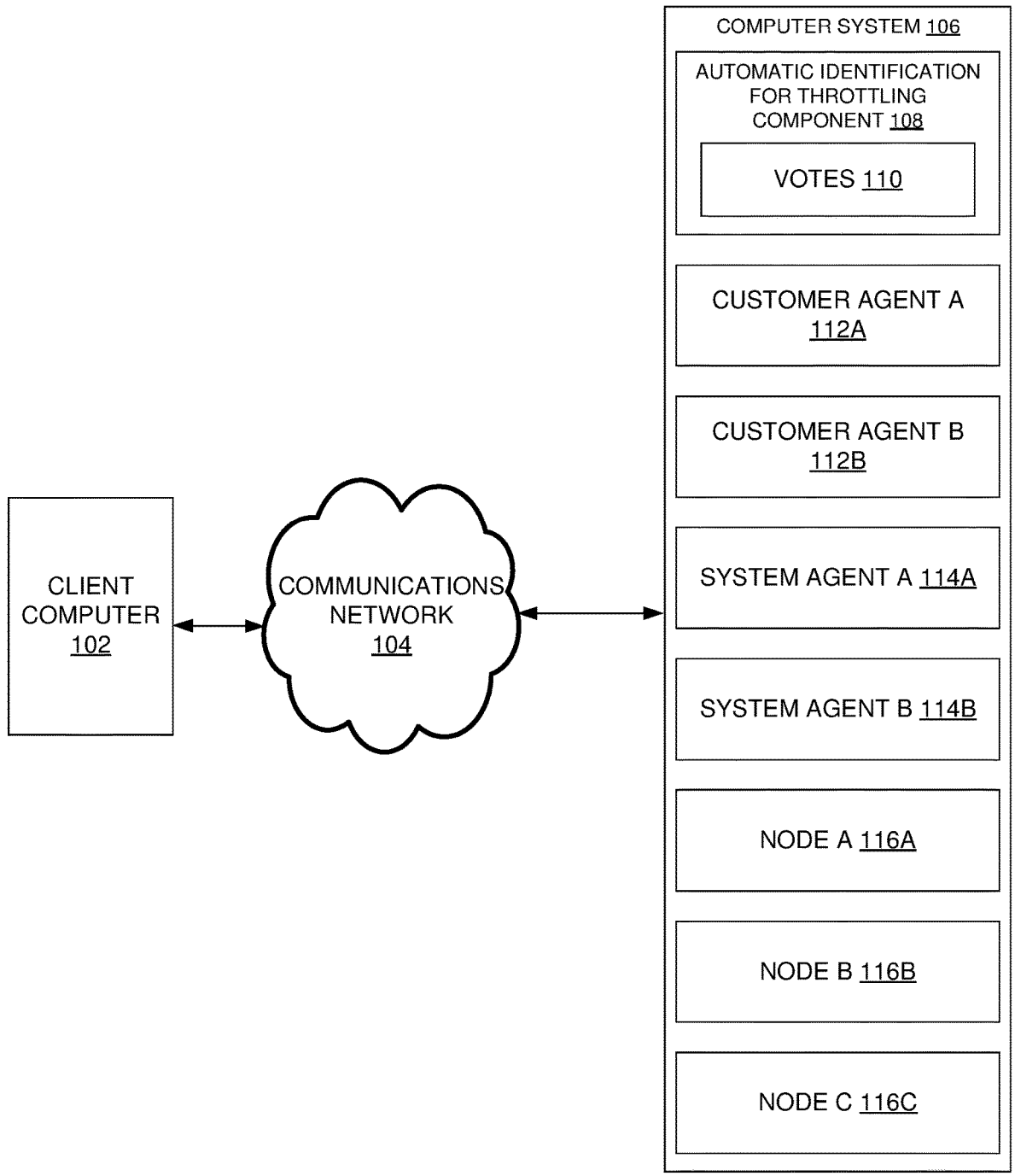
FIG. 1 illustrates an example system architecture that can facilitate automatic identification of computer agents for throttling, in accordance with certain embodiments of this disclosure.

Sometimes computer processes that perform tasks to maintain a health of a file system can consume too many computing resources, and start harming computer performance, which can harm customers.

According to the present techniques, processes that are causing—or are about to cause—a drop in performance can be automatically identified so that they can be throttled to avoid impacting customers. In some examples, insight can be provided as to which circumstances lead to drops in performance. This information on circumstances that lead to drops in performance can be used later to identify when a computing cluster will perform poorly, and to automatically predict and avoid these problems (such as via a neural network).

The present techniques can utilize a voting mechanism that can lead to patterns emerging by themselves from performance and resource usage data.

The current techniques (which can be referred to as "partitioned performance") can be utilized to throttle processes to avoid (or limit the impact of) drops in performance. A set of metrics (e.g., central processing unit (CPU) usage, latency, etc.) can be used to determine when a cluster is experiencing low performance. It can be determined which processes have been running recently, and how much work they have performed.

Additionally, circumstances that lead to a drop in performance can be determined, as well as which processes can be throttled to avoid this drop in performance. In some examples according to the present techniques, a storage cluster can automatically determine rules for identifying the relevant circumstances and processes.

A voting mechanism according to the present techniques can permit a pattern to emerge by itself when a drop in performance is about to occur. A system can then identify automatically which processes are playing a role in this performance drop, and take action accordingly to mitigate against it.

The following terms can be used herein.

Computer agent—a thread, a process, or an entity that consumes computing resources, such as in a file system.

Partitioned performance component—a component that can track resource usage for computer agents. It can be appreciated that there are various profiling techniques that can be used to track resource usage for computer agents.

Work item—a chunk of work produced by a computer agent, which can vary between agents. A partitioned performance component can track resource usage for each work item (e.g., how much CPU was used, input/output operations per second (IOPS), etc.).

Resources—things that computer agents consume and a partitioned performance component can track. For example, resources can be an amount of CPU used, an amount of computer memory use, an amount of free disk space, etc.

Cluster/system health—an objective measure of how well a cluster is performing. This metric can correlate to the quality of an experience of a user who is using the cluster, and can be measured in various ways. For example, user experience can be measured via the round-trip time of a regular network message, a latency of the system, an amount of time it takes to acquire an exclusive lock on a specific logical Mode (LIN), etc.

Critical state—a state where the health of a cluster is about to drop to a level that would negatively impact user experience. For example, a state where access to files in a file system is slow, but acceptable.

Bad state—a state where the health of a cluster has dropped so much that the user experience is negatively impacted beyond by an acceptable amount. For example, this can be a state where access to files in a file system is so slow that customers start phoning for support or escalate support tickets.

Vote—a representation that a particular process is consuming resources. A vote can be implemented using such things as a positive floating-point number, a list of numbers, an array, or a n-dimensional matrix. A system can accumulate, or add, votes for each of one or more processes.

Vote fading—decrementing votes over time to prevent unbound votes. This can comprise subtracting a small number (e.g., 0.01) from each vote every n seconds. Where a vote is implemented with an array or a matrix, for example, then each element of this data structure can be similarly decremented. In some examples, a lowest-allowed value for a vote is zero, and votes cannot have negative values.

In some examples, automatic identification of computer agents for throttling can be implemented as follows. Computer agents can register themselves in a portioned performance component framework. Upon registration, each computer agent can be issued an empty vote (e.g., a floating-point number that is initialized to a value of zero). When a computer agent finishes working on an item, the partitioned performance component can cast and accumulate a vote for that computer agent. This vote can be weighed by how many resources the computer agent consumed, as well as the health of the cluster. Periodically (e.g., every n seconds), the partitioned performance component can review the votes for the computer agents and decrement their values until they reach zero. Where the partitioned performance component detects that the cluster is in a critical, or bad, state, then the partitioned performance component can select one or more computer agents with votes above a predetermined threshold value and throttle them.

This voting mechanism can permit patterns to automatically emerge, without human intervention, when the cluster is in a critical, or bad, state.

Approaches according to the present techniques can involve votes being cast to the computer agents that have been performing work in the recent past. The weight of a vote can be proportional to an amount of work performed, so that a computer agent that has consumed the most resources receives the largest vote. When a cluster is approaching a critical, or bad, state, the weights of the votes can also be higher. Conversely, votes can fade over time, so that when a computer agent stops working, its vote will eventually reach a value of zero.

When a cluster approaches a critical state, the system can analyze which computer agents have the highest vote values, and throttle those computer agents. A reason for this action can be that the computer agents that have been the most active recently can be the most likely to be causing a drop in performance. If the votes are weighed with a health of the cluster, then computer agents that were active closer to a time of a critical, or bad, state can be throttled first. Since vote values can fade over time, computer agents with smaller votes can start to be throttled as well, if the cluster continues to be in a critical, or bad, state. So, eventually, all computer agents can become throttled if the cluster remains in this critical, or bad, state. In this manner, a risk of only throttling computer agents that probably did not cause the drop in performance can be avoided, while at the same time first throttling those computer agents that are most likely to have caused trouble.

In some examples, votes are represented with floating-point values. In other examples, votes can be represented with lists of numbers, such as one number for each resource that a partitioned performance component is configured to track. In some examples, votes can be represented with n-dimensional matrices, which can provide a richer pattern with insights into a state of each resource at a time when a cluster enters a critical, or bad, state.

When a partitioned performance component determines to throttle one or more computer agents, a snapshot of a current state of the computer agents' votes and a state of system resources (e.g., free computer memory, free disk space, CPU usage, state of a file system journal, etc.) can be saved for later use. This state snapshot can also include recent history information. This information can be useful both to an administrator of the system (to aid in discovering what led to a cluster entering a critical, or bad, state), and for other techniques.

For example, a neural network component can analyze state snapshot data to learn when a specific state is correlated with the system being in a critical, or bad, state (e.g., after the same pattern has been observed to consistently lead to a critical, or bad, state at least a threshold number of times). After a training period, this neural network component can predict when a cluster will enter a critical, or bad, state and take mitigating action. In some examples, the neural network component can be trained offline, after a number of state snapshots have been collected, and a trained neural network component can be installed with a new instance of a partitioned performance component.

It can be appreciated that throttling a computer agent can be performed according to various techniques, such as lowering a priority of the computer agent, or instructing the computer agent to sleep for a longer period of time between periods of activity. In some examples, it can be determined to ignore certain computer agents and permit them to continue to consume resources even if that negatively impacts user experience.

Broadly, examples according to the present techniques can involve pattern recognition, and unsupervised creation of patterns from data. Examples according to the present techniques can also involve voting approaches for pattern extraction.

Other techniques can be utilized to prevent CPUs from overheating from processing too great a load, and these techniques can be referred to as thermal throttling. In contrast to the present techniques, thermal throttling can involve purposefully incurring a performance penalty to prevent a CPU from overheating, whereas the present techniques can be implemented to prevent drops in performance (from a user's perspective) to maintain user experience. Thermal throttling can generally involve slowing down a CPU clock in response to overheating, which can harm the performance of all processes that execute on this CPU. In contrast to that, the present techniques can be implemented to identify a subset of processes that are causing problems, and constrain throttling only to them.

In some previous approaches, operating systems can detect when a process is not responsive, but not that certain processes are consuming too much resources, and so negatively impacting users. The present techniques can permit for an operating system to identify agents that are consuming too many resources. Similarly, the present techniques can be applied to CPU throttling. Instead of throttling the whole CPU, those processes that need to be throttled can be identified, and just those processes can be throttled instead.

Example Architecture

FIG. 1 illustrates an example system architecture 100 that can facilitate automatic identification of computer agents for throttling, in accordance with certain embodiments of this disclosure.

As depicted, system architecture 100 comprises client computer 102, communications network 104, and computer system 106. In turn, computer system 106 comprises automatic identification for throttling component 108 (which itself comprises votes 110), customer agent A 112A, customer agent B 112B, system agent A 114A, system agent B 114B, node A 116A, node B 116B, and node C 116C.

Figure 15:
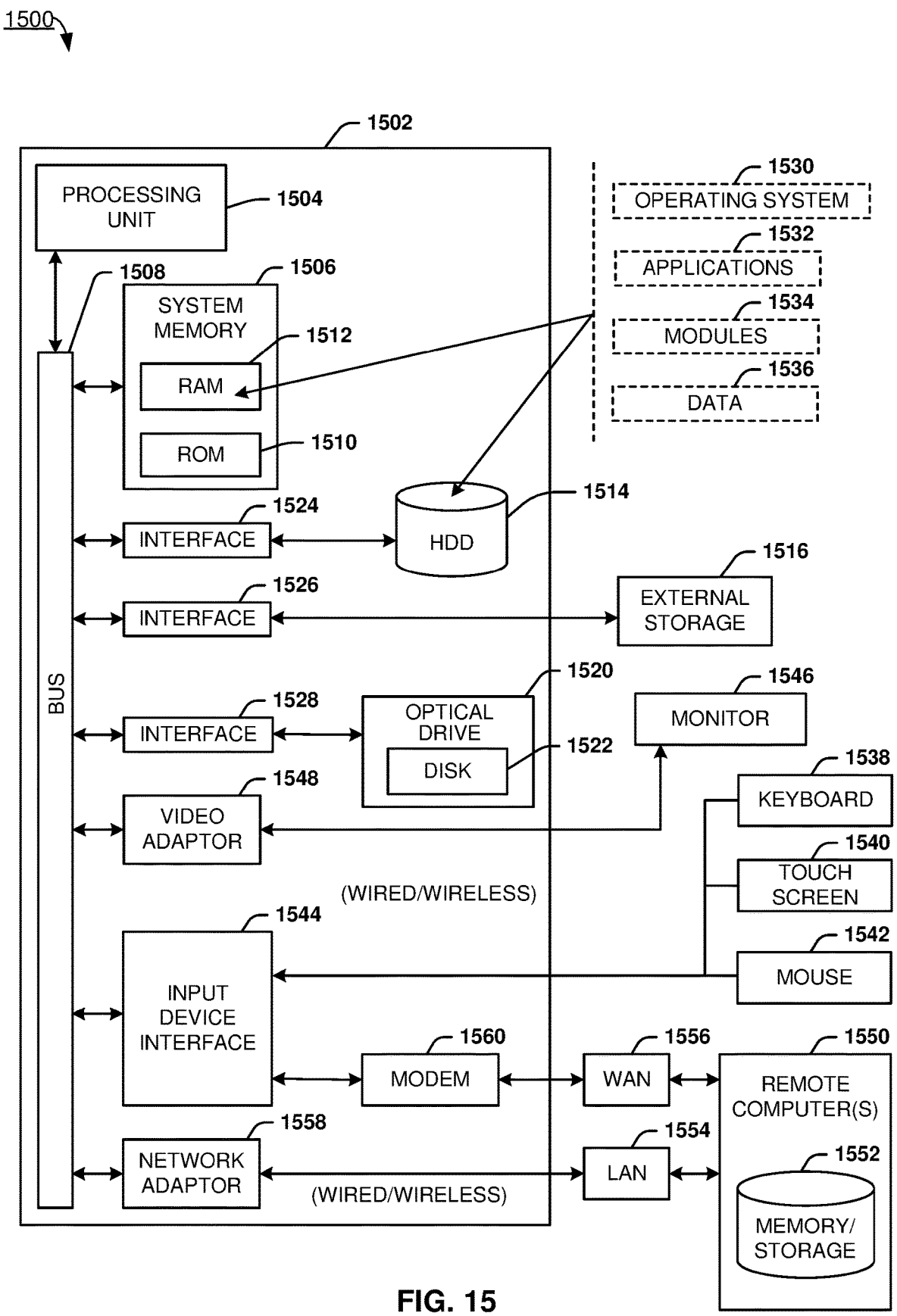
FIG. 15 illustrates an example block diagram of a computer operable to execute certain embodiments of this disclosure.

Each of client computer 102, computer system 106, node A 116A, node B 116B, and node C 116C can be implemented with one or more instances of computer 1502 of FIG. 15. In some examples, computer system 106 comprises a cluster and/or distributed storage system that comprises multiple instances of computer 1502 of FIG. 15. In some examples, each of automatic identification for throttling component 108, customer agent A 112A, customer agent B 112B, system agent A 114A, and/or system agent B 114B can be implemented with machine-executable instructions and/or part(s) of computer 1502 of FIG. 15.

It can be appreciated that system architecture 100 is depicted logically. For example, one or more of automatic identification for throttling component 108, customer agent A 112A, customer agent B 112B, system agent A 114A, and system agent B 114B can execute on node A 116A, node B 116B, and/or node C 116C.

Communications network 104 can comprise a computer communications network, such as the Internet, or an isolated private computer communications network.

Client computer 102 can access computer system 106 via communications network 104. In some examples, client computer 102 can access computer storage resources provided computer system 106.

Automatic identification for throttling component 108 can track work items performed by system agents (e.g., system agent A 114A and system agent B 114B) and convert these completed work items into a value for a vote to track in votes 110 (which can be, for example, a data structure of integers, where an integer represents a vote for a process). For example, a value for a vote can be scaled to correspond to an amount of computing resources that a process used in completing the given work item.

System agents can initially register with automatic identification for throttling component 108, and then report to automatic identification for throttling component 108 upon completing a work item.

When automatic identification for throttling component 108 determines that a condition of computer system 106 has degraded past a predetermined threshold level of performance, automatic identification for throttling component 108 can select one or more system agents to throttle. In an example, automatic identification for throttling component 108 can select those system agents having vote values above a predetermined threshold value. A way that automatic identification for throttling component 108 can throttle a system agent is by sending the system agent a message indicating that the system agent should increase an amount of time that the system agent sleeps between bouts of performing work.

In this manner, automatic identification for throttling component 108 can preserve user experience by permitting customer agents to execute fully by throttling certain system agents that are using lots of system resources when there is resource contention.

Customer agent A 112A and customer agent B 112B can each comprise a computer process that perform customer operations, such as reading data stored on computer system 106 and transmitting that data to client computer 102 via communications network 104, or such as writing data to computer system 106 that is received from client computer 102 via communications network 104.

System agent A 114A and system agent B 114B can each comprise a computer process that perform system operations, such as those that maintain the health of a file system of computer system 106. These system operations can include restoring node and drive free space balance, reclaiming leaked blocks, and rebuilding a RAID.

Figure 2:
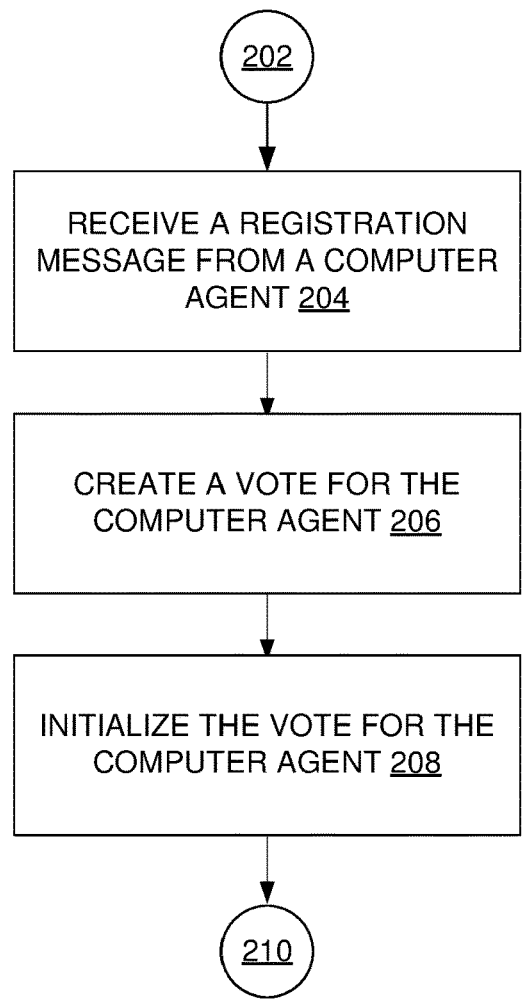
FIG. 2 illustrates an example process flow for registering a worker that can facilitate automatic identification of computer agents for throttling, in accordance with certain embodiments of this disclosure.
Figure 3:
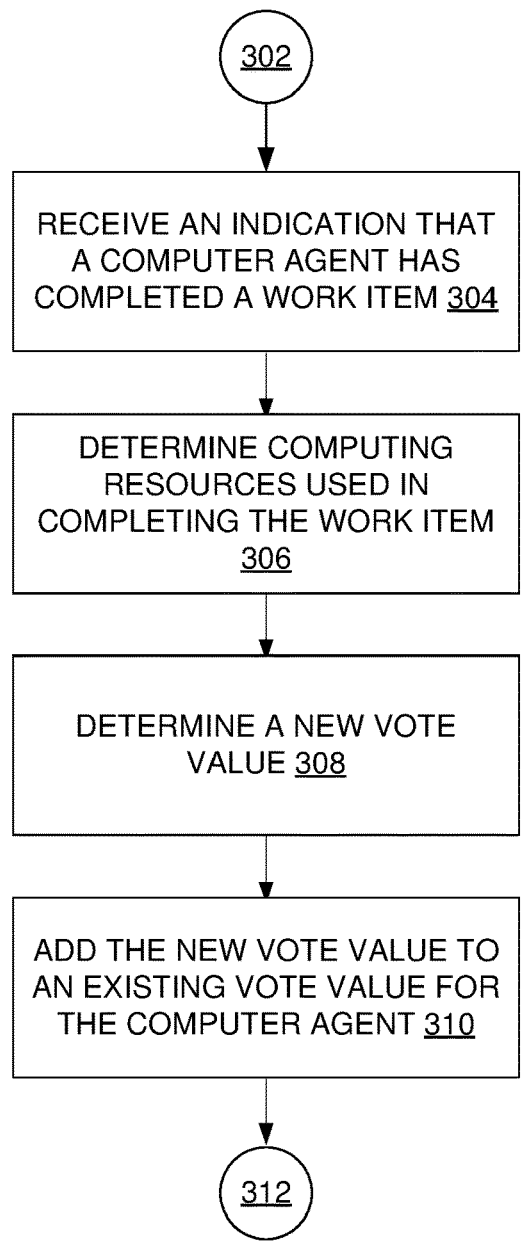
FIG. 3 illustrates an example process flow for tabulating a vote for a completed work item that can facilitate automatic identification of computer agents for throttling, in accordance with certain embodiments of this disclosure.
Figure 4:
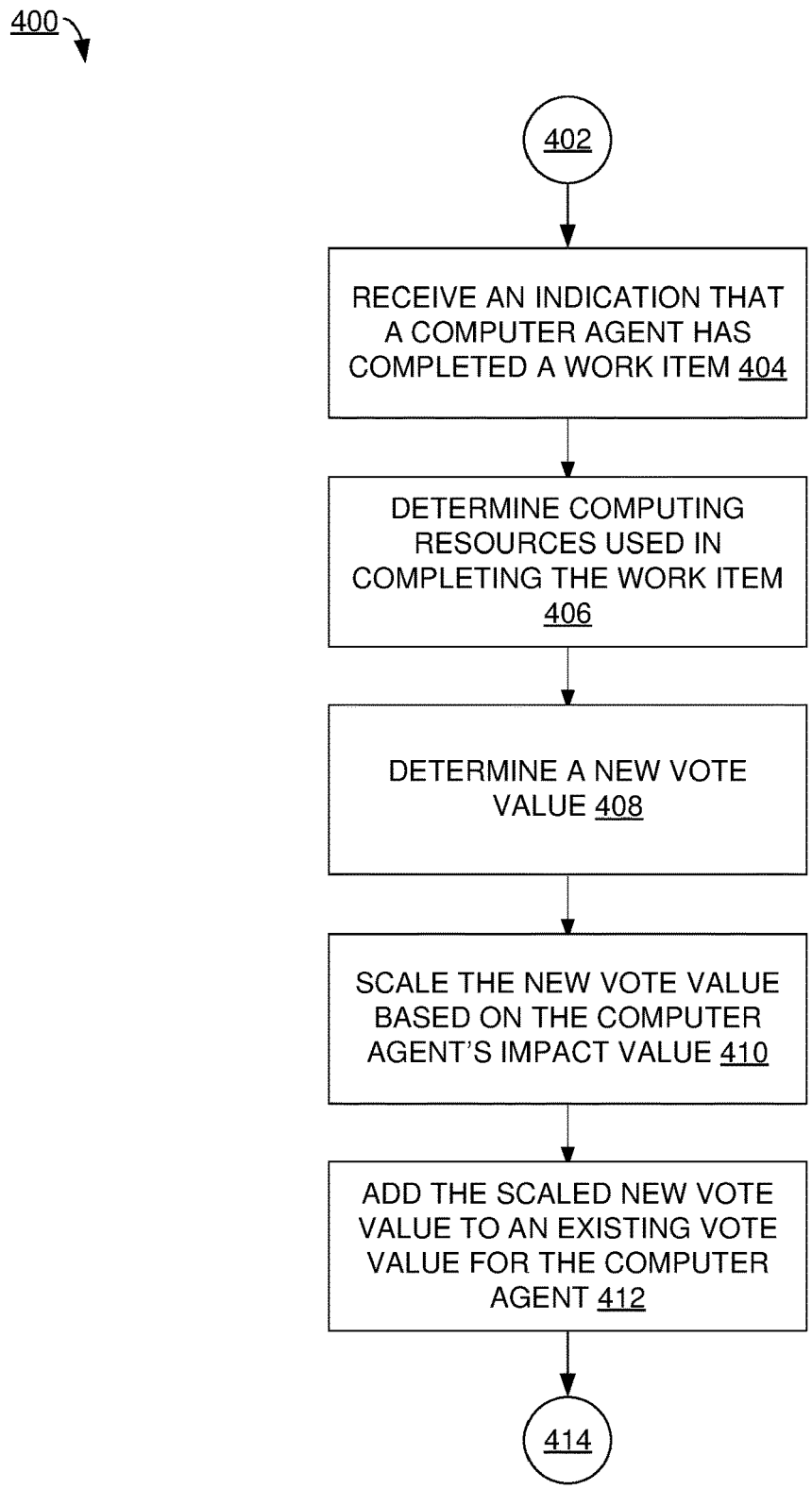
FIG. 4 illustrates an example process flow for tabulating a vote based on impact that can facilitate automatic identification of computer agents for throttling, in accordance with certain embodiments of this disclosure.
Figure 5:
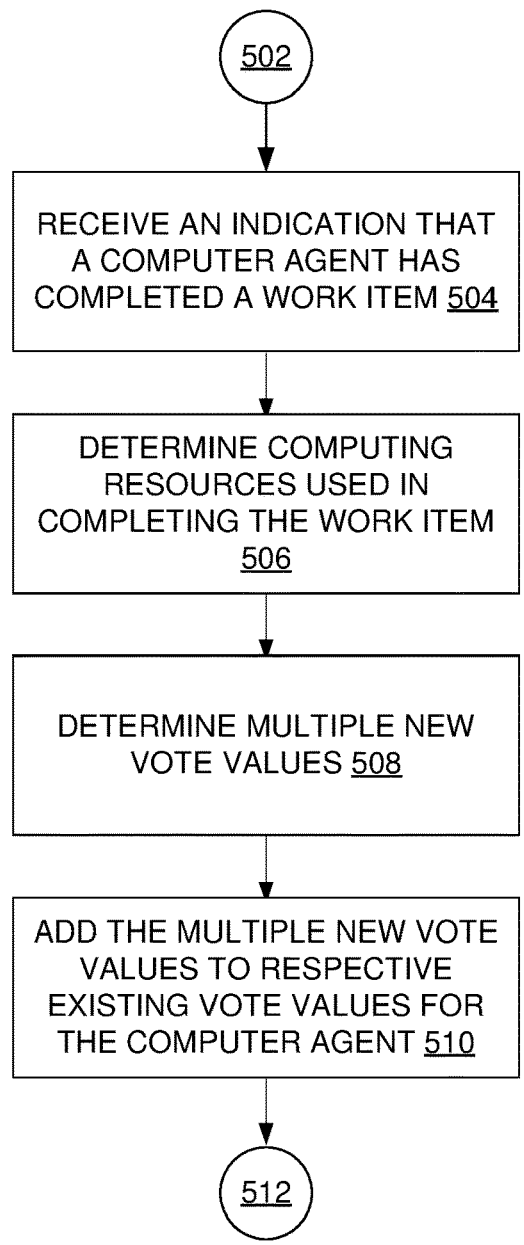
FIG. 5 illustrates an example process flow for tabulating a n-dimensional vote based on impact that can facilitate automatic identification of computer agents for throttling, in accordance with certain embodiments of this disclosure.
Figure 6:
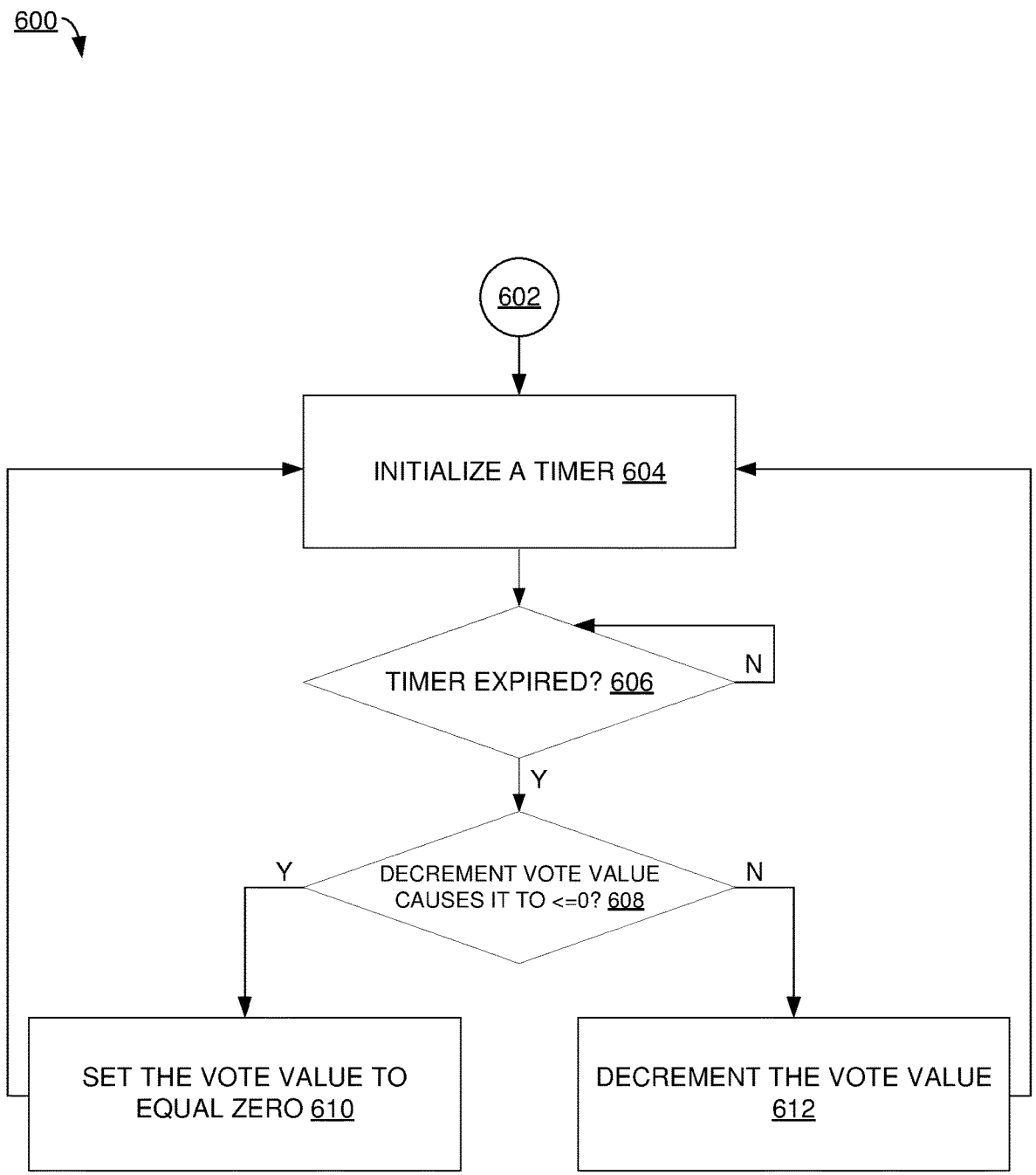
FIG. 6 illustrates an example process flow for fading a vote for a completed work item that can facilitate automatic identification of computer agents for throttling, in accordance with certain embodiments of this disclosure.
Figure 7:
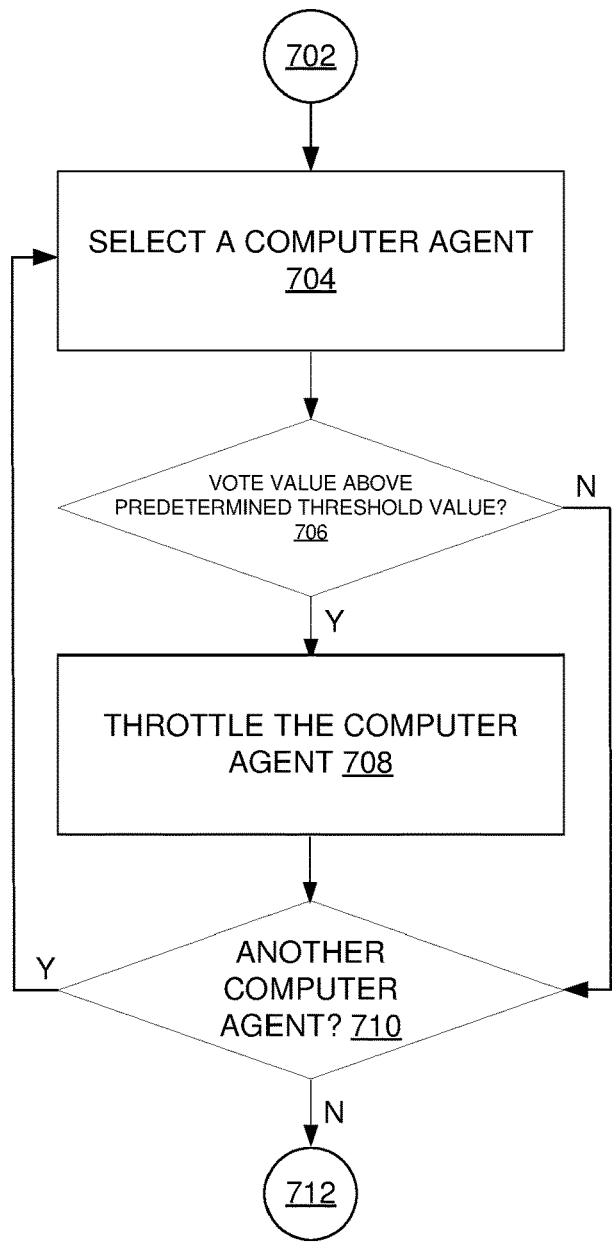
FIG. 7 illustrates an example process flow for throttling a computer agent that can facilitate automatic identification of computer agents for throttling, in accordance with certain embodiments of this disclosure.
Figure 8:
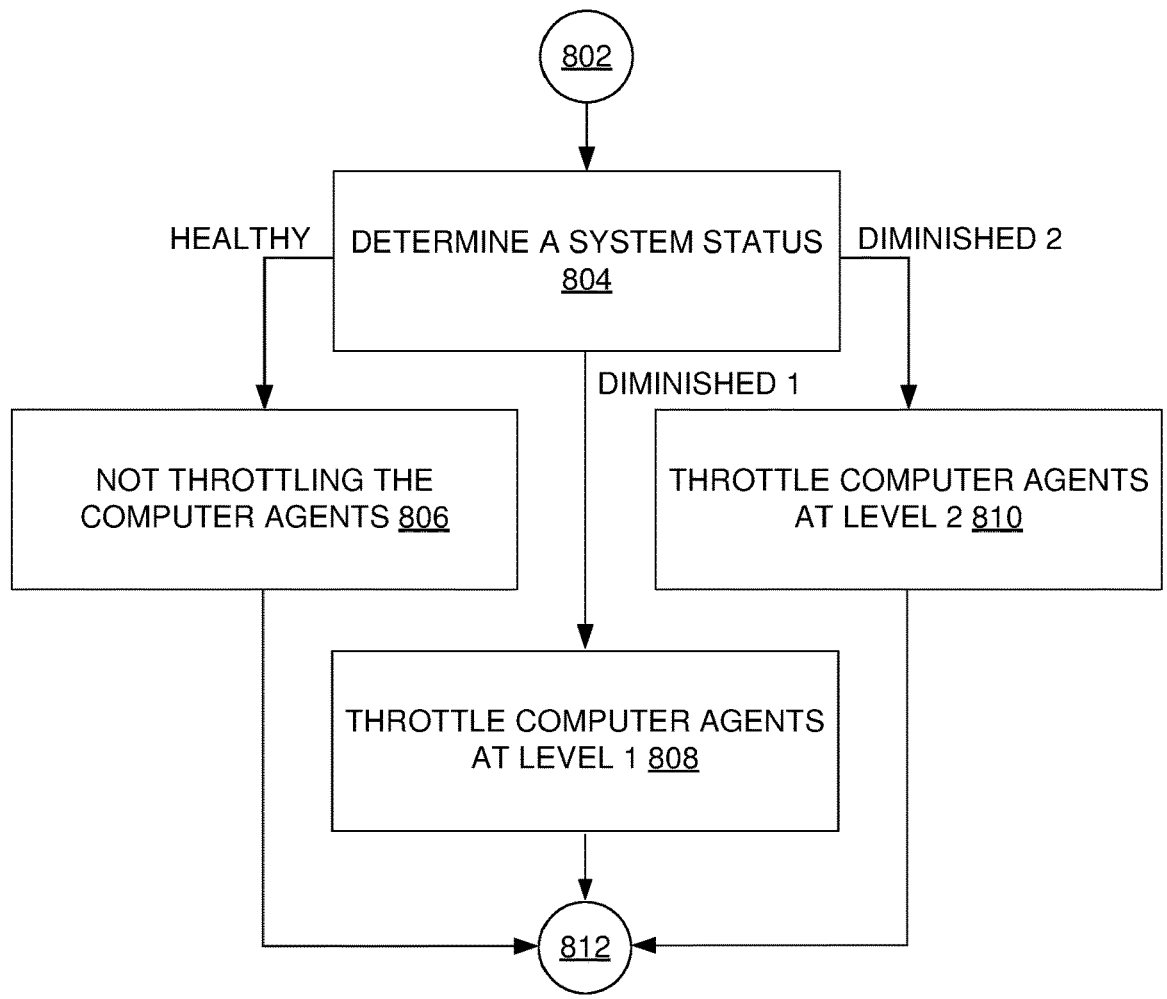
FIG. 8 illustrates an example process flow for throttling a computer agent with multiple degrees of severity that can facilitate automatic identification of computer agents for throttling, in accordance with certain embodiments of this disclosure.
Figure 9:
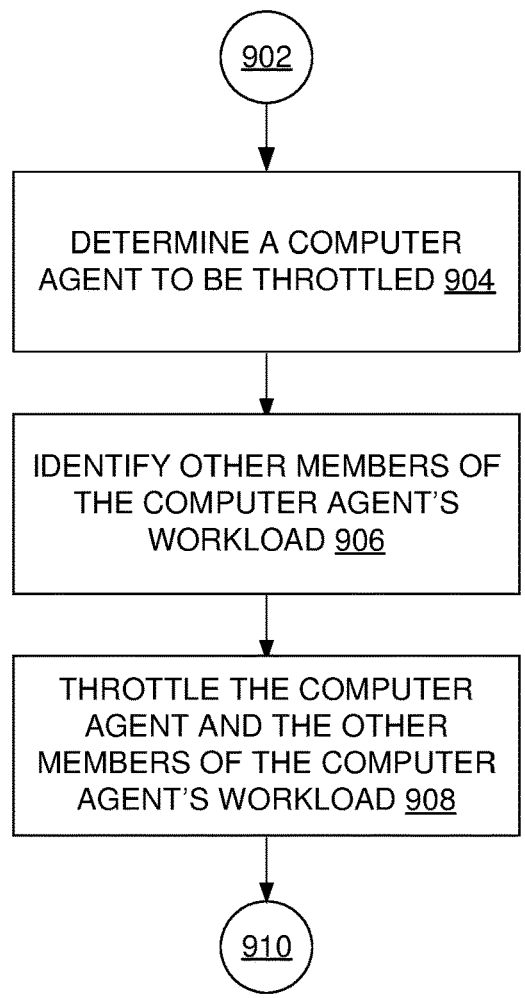
FIG. 9 illustrates an example process flow for throttling a computer agent's workload that can facilitate automatic identification of computer agents for throttling, in accordance with certain embodiments of this disclosure.
Figure 10:
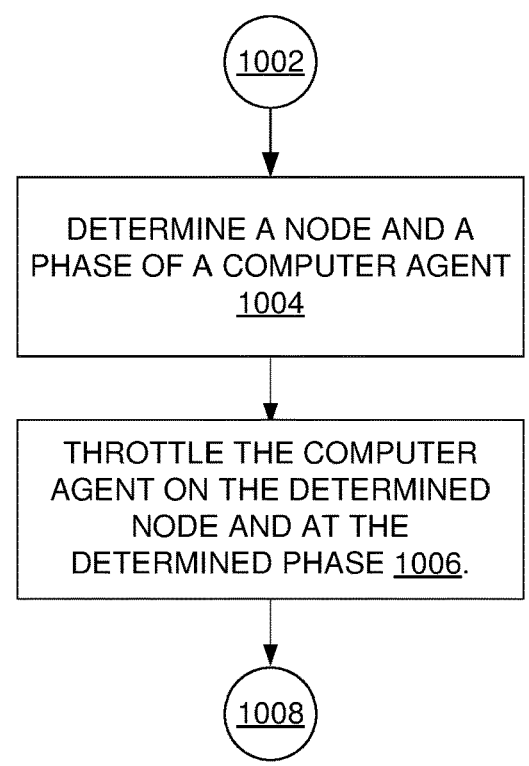
FIG. 10 illustrates an example process flow for attributing work to nodes that can facilitate automatic identification of computer agents for throttling, in accordance with certain embodiments of this disclosure.
Figure 11:
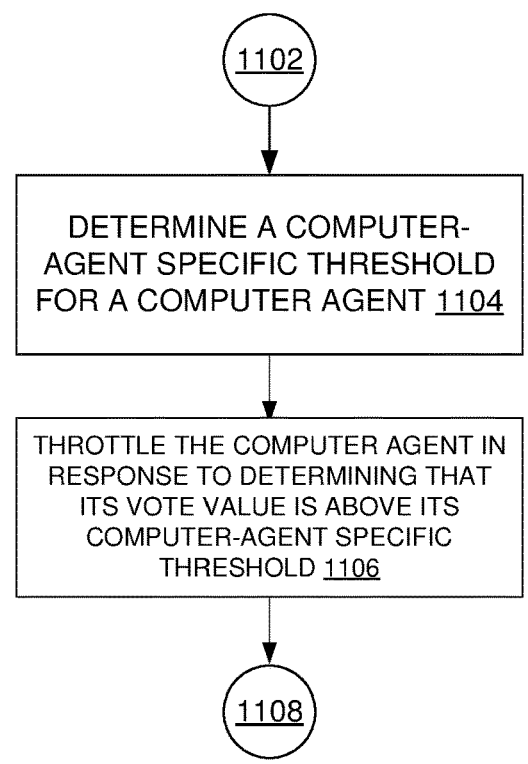
FIG. 11 illustrates an example process flow for per-agent throttling thresholds for automatic identification of computer agents for throttling, in accordance with certain embodiments of this disclosure.
Figure 12:
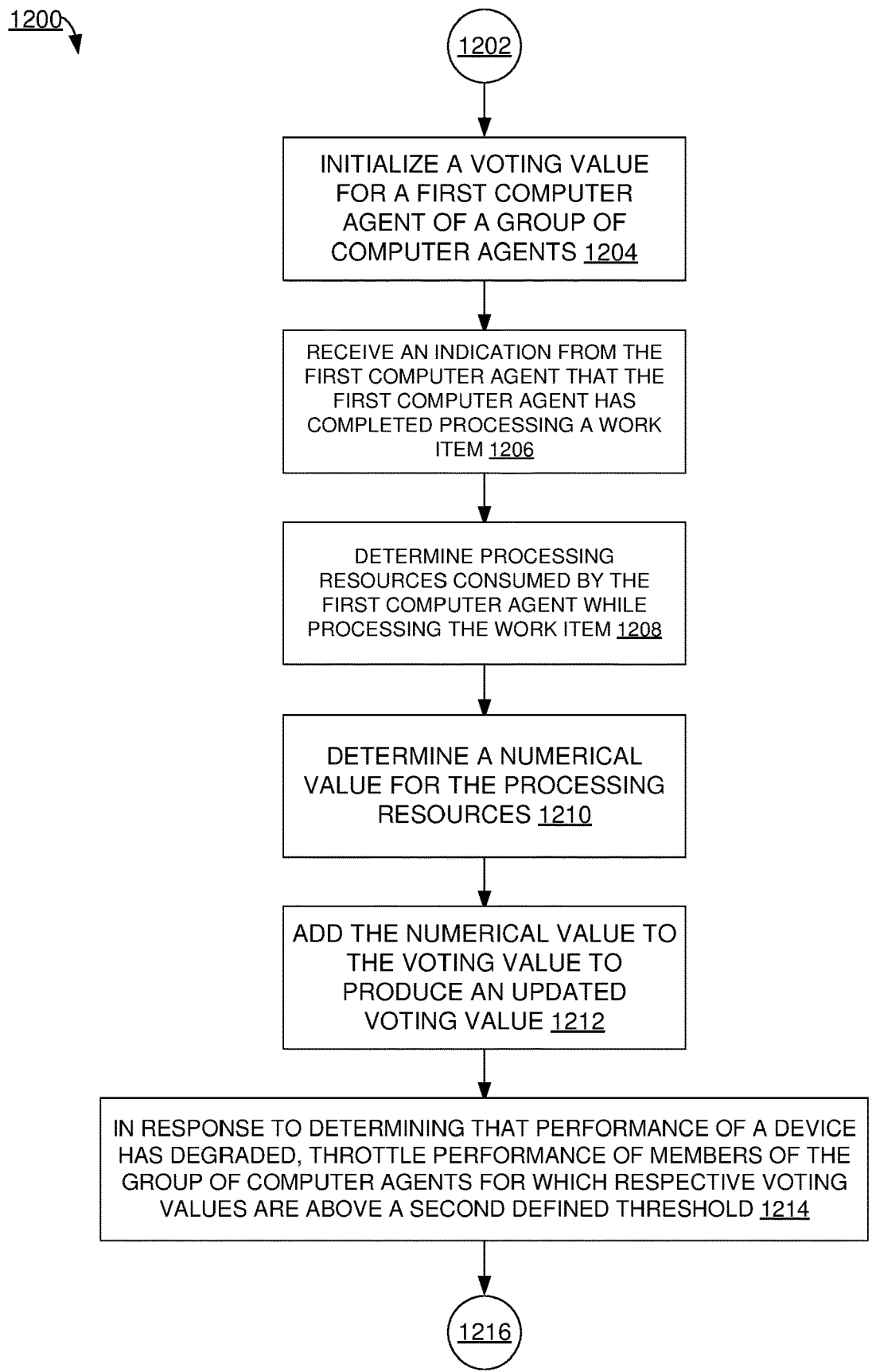
FIG. 12 illustrates an example process flow for automatic identification of computer agents for throttling, in accordance with certain embodiments of this disclosure.
Figure 13:
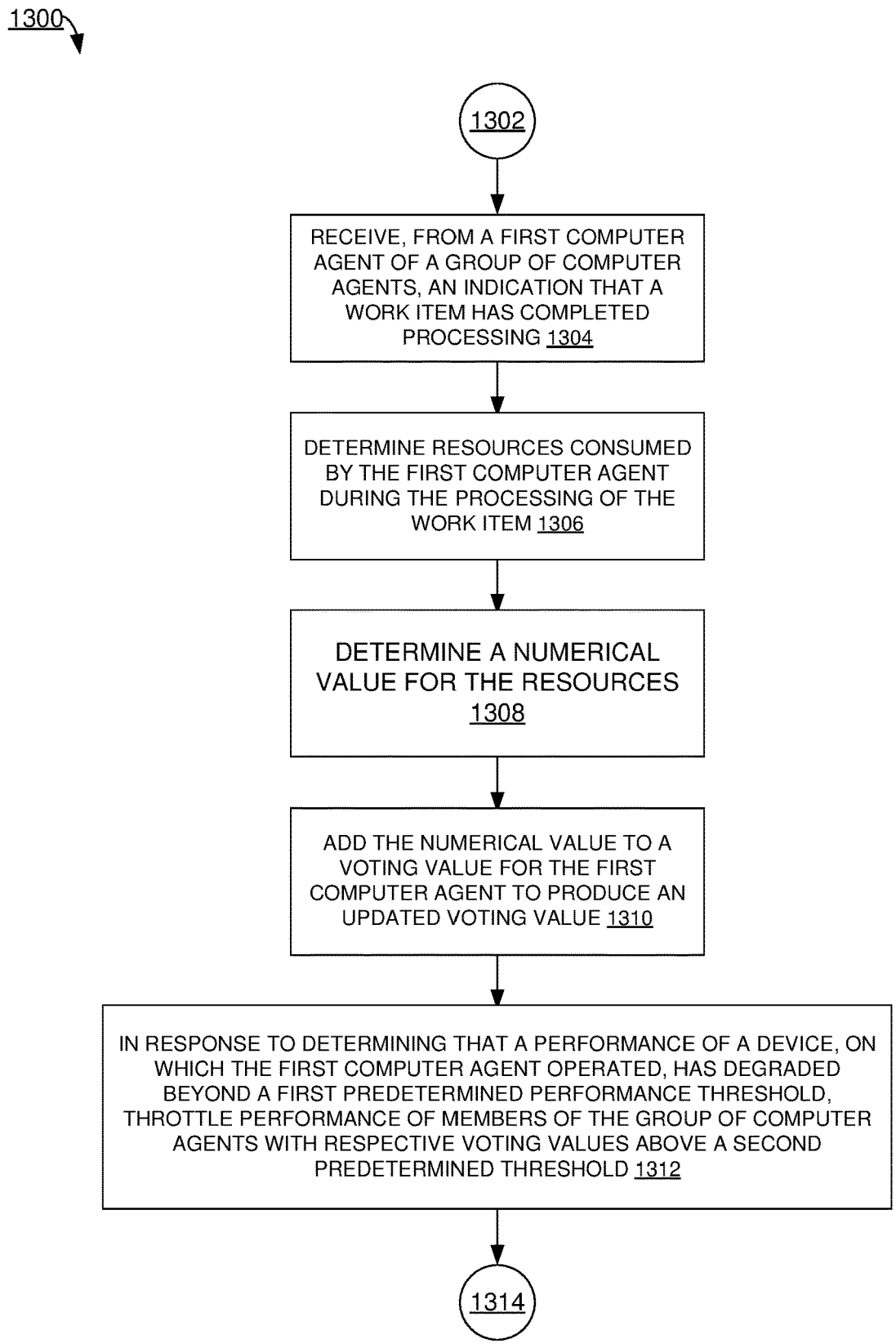
FIG. 13 illustrates another example process flow for automatic identification of computer agents for throttling, in accordance with certain embodiments of this disclosure.
Figure 14:
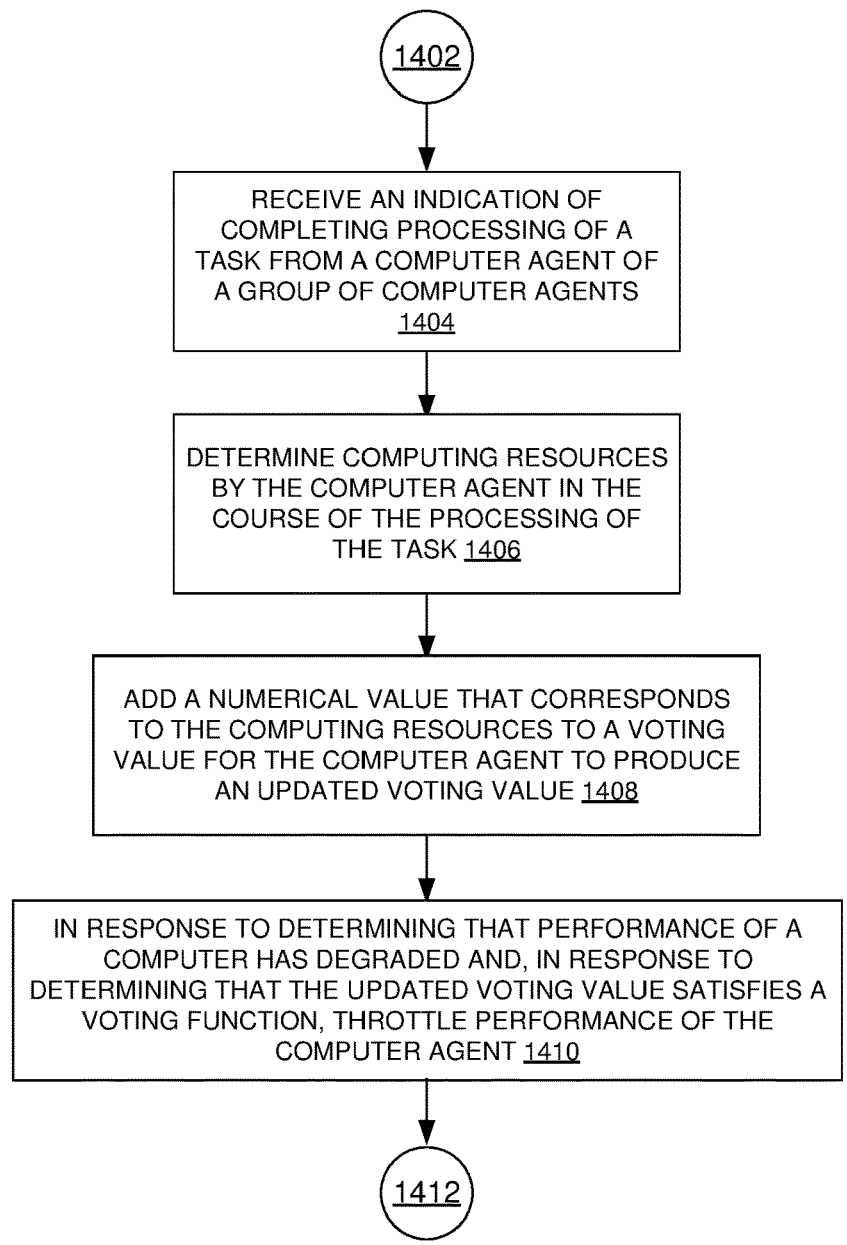
FIG. 14 illustrates another example process flow for automatic identification of computer agents for throttling, in accordance with certain embodiments of this disclosure.

In implementing automatic identification of computer agents for throttling in this manner, automatic identification for throttling component 108 can implement part(s) of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, process flow 1100 of FIG. 11, process flow 1200 of FIG. 12, process flow 1300 of FIG. 13, and/or process flow 1400 of FIG. 14.

Example Process Flows

FIG. 2 illustrates an example process flow 200 for registering a worker that can facilitate automatic identification of computer agents for throttling, in accordance with certain embodiments of this disclosure. In some examples, one or more embodiments of process flow 200 can be implemented by automatic identification for throttling component 108 of FIG. 1, or computing environment 1500 of FIG. 15.

It can be appreciated that the operating procedures of process flow 200 are example operating procedures, and that there can be embodiments that implement more or fewer operating procedures than are depicted, or that implement the depicted operating procedures in a different order than as depicted. In some examples, process flow 200 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, process flow 1100 of FIG. 11, process flow 1200 of FIG. 12, process flow 1300 of FIG. 13, and/or process flow 1400 of FIG. 14.

Process flow 200 begins with 202, and moves to operation 204. Operation 204 depicts receiving a registration message from a computer agent. In some examples, this comprises automatic identification for throttling component 108 of FIG. 1 receiving a registration message from system agent A 114A or system agent B 114B, where the registration message notifies automatic identification for throttling component 108 that the process is active and will send automatic identification for throttling component 108 information about work items that the process completes. After operation 204, process flow 200 moves to operation 206.

Operation 206 depicts creating a vote for the computer agent. In some examples, this can comprise automatic identification for throttling component 108 of FIG. 1 initializing or associating a data structure in votes 110 that can be used to track a vote for the computer agent. In some examples, this vote can comprise an integer or floating point number. In other examples, this vote can comprise an entry in an array, or a multi-dimensional array (such as where multiple votes are maintained for one computer agent). After operation 206, process flow 200 moves to operation 208.

Operation 208 depicts initializing the vote for the computer agent. In some examples, initializing the vote comprises setting the vote created in operation 206 to be equal to zero. After operation 208, process flow 200 moves to 210, where process flow 200 ends.

After implementing an instance of process flow 200 for a computer agent, automatic identification for throttling component 108 can be configured to receive information about work items that the computer agent has completed, determine a vote value for the completed work item, and determine which computer agents are to be throttled based on their respective votes.

FIG. 3 illustrates an example process flow 300 for tabulating a vote for a completed work item that can facilitate automatic identification of computer agents for throttling, in accordance with certain embodiments of this disclosure. In some examples, one or more embodiments of process flow 300 can be implemented by automatic identification for throttling component 108 of FIG. 1, or computing environment 1500 of FIG. 15.

It can be appreciated that the operating procedures of process flow 300 are example operating procedures, and that there can be embodiments that implement more or fewer operating procedures than are depicted, or that implement the depicted operating procedures in a different order than as depicted. In some examples, process flow 300 can be implemented in conjunction with one or more embodiments of one or more of process flow 200 of FIG. 2, process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, process flow 1100 of FIG. 11, process flow 1200 of FIG. 12, process flow 1300 of FIG. 13, and/or process flow 1400 of FIG. 14.

Process flow 300 begins with 302, and moves to operation 304. Operation 304 depicts receiving an indication that a computer agent has completed a work item. When a computer agent has completed processing a work item, the computer agent can send an indication of this to automatic identification for throttling component 108 of FIG. 1. In some examples, an amount of work that comprises a work item can be predefined (such as through user input), and vary between computer agents or types of work being performed. After operation 304, process flow 300 moves to operation 306.

Operation 306 depicts determining computing resources used in completing the work item. In some examples, the computer agent reports the amount of computing resources to automatic identification for throttling component 108 of FIG. 1. In other examples, automatic identification for throttling component 108 can use an identifier of the computer agent (such as a process identifier) to query a service for this information. Computing resources used can include things such as processor time, memory, and network bandwidth. After operation 306, process flow 300 moves to operation 308.

Operation 308 depicts determining a new vote value. This new vote value can be determined based on an amount (and type) of computing resources used, as determined in operation 306. In some examples, a vote value can be a numerical value that represents the amount of computing resources used, where a larger vote value represents more computing resources being used. After operation 308, process flow 300 moves to operation 310.

Operation 310 depicts adding the new vote value to an existing vote value for the computer agent. The existing vote value can be a vote value stored by automatic identification for throttling component 108 of FIG. 1 in votes 110. The new vote value and existing vote values can be summed, and saved to the same location where the existing vote value was stored. After operation 310, process flow 300 moves to 312, where process flow 300 ends.

As work items are completed, vote values can be increased for the corresponding computer agent (and faded over time). These vote values can be used to determine which computer agents to throttle.

FIG. 4 illustrates an example process flow 400 for tabulating a vote based on impact that can facilitate automatic identification of computer agents for throttling, in accordance with certain embodiments of this disclosure. In some examples, one or more embodiments of process flow 400 can be implemented by automatic identification for throttling component 108 of FIG. 1, or computing environment 1500 of FIG. 15.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 200 of FIG. 2, process flow 300 of FIG. 3, process flow 500 of FIG. 5, process flow 600 of FIG. 6, process flow 700 of FIG. 7, process flow 800 of FIG. 8, process flow 900 of FIG. 9, process flow 1000 of FIG. 10, process flow 1100 of FIG. 11, process flow 1200 of FIG. 12, process flow 1300 of FIG. 13, and/or process flow 1400 of FIG. 14.

Process flow 400 begins with 402, and moves to operation 404. Operation 404 depicts receiving an indication that a computer agent has completed a work item. In some examples, operation 404 can be implemented in a similar manner as operation 304 of FIG. 3. After operation 404, process flow 400 moves to operation 406.

Operation 406 depicts determining computing resources used in completing the work item. In some examples, operation 406 can be implemented in a similar manner as operation 306 of FIG. 3. After operation 406, process flow 400 moves to operation 408.

Operation 408 depicts determining a new vote value. In some examples, operation 408 can be implemented in a similar manner as operation 308 of FIG. 3. After operation 408, process flow 400 moves to operation 410.

Operation 410 depicts scaling the new vote value based on the computer agent's impact value. In some examples, this can comprise dividing the vote value by the impact value, such that a larger impact value results in a smaller scaled new vote value. After operation 410, process flow 400 moves to operation 412.

Operation 412 depicts adding the scaled new vote value to an existing vote value for the computer agent. In some examples, operation 412 can be implemented in a similar manner as operation 310 of FIG. 3. After operation 412, process flow 400 moves to 414, where process flow 400 ends.

Scaling the vote value as in process flow 400 can be implemented to refine which computer agents are throttled. It may be determined that some computer agents should be throttled less often (that is, allowed to consume more computing resources before being throttled), such as because they are important to the functioning of the computer system.

In some examples, a computer agent with a higher impact value can be assigned a smaller scaled new vote value for a given amount of processing resources utilized in completing a work item. Where computer agents are throttled based on having a vote value above a predetermined threshold value, increasing a computer agent's vote value by less results in a decrease in the likelihood that the computer agent will be throttled.

There can be other embodiments of applying an impact value. For example, each computer agent can have a different predetermined threshold value for throttling, where this respective predetermined threshold value for throttling is determined based on the computer agent's impact value (where a higher impact value can lead to a higher predetermined threshold value for throttling).

FIG. 5 illustrates an example process flow 500 for tabulating a n-dimensional vote based on impact that can facilitate automatic identification of computer agents for throttling, in accordance with certain embodiments of this disclosure. In some examples, one or more embodiments of process flow 500 can be implemented by automatic identification for throttling component 108 of FIG. 1, or computing environment 1500 of FIG. 15.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 200 of FIG. 2, process flow 300 of FIG. 3, process flow 400 of FIG. 4, process flow 600 of FIG. 6, process flow 700 of FIG. 7, process flow 800 of FIG. 8, process flow 900 of FIG. 9, process flow 1000 of FIG. 10, process flow 1100 of FIG. 11, process flow 1200 of FIG. 12, process flow 1300 of FIG. 13, and/or process flow 1400 of FIG. 14.

Process flow 500 begins with 502, and moves to operation 504. Operation 404 depicts receiving an indication that a computer agent has completed a work item. In some examples, operation 504 can be implemented in a similar manner as operation 304 of FIG. 3. After operation 504, process flow 500 moves to operation 506.

Operation 506 depicts determining computing resources used in completing the work item. In some examples, operation 506 can be implemented in a similar manner as operation 306 of FIG. 3. After operation 506, process flow 500 moves to operation 508.

Operation 508 depicts determining multiple new vote values. In some examples, each of these multiple new vote values can correspond to a different metric of computing resources used. For example, one vote value can correspond to processor time, another vote value can correspond to memory utilization, and another vote value can correspond to network bandwidth. After operation 508, process flow 500 moves to operation 510.

Operation 510 depicts adding the multiple new vote values to respective existing vote values for the computer agent. In some examples, operation 510 can be implemented in a similar manner as operation 310 of FIG. 3, but for multiple vote values rather than one vote value. After operation 510, process flow 500 moves to 512, where process flow 500 ends.

FIG. 6 illustrates an example process flow 600 for fading a vote for a completed work item that can facilitate automatic identification of computer agents for throttling, in accordance with certain embodiments of this disclosure. In some examples, one or more embodiments of process flow 600 can be implemented by automatic identification for throttling component 108 of FIG. 1, or computing environment 1500 of FIG. 15.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 200 of FIG. 2, process flow 300 of FIG. 3, process flow 400 of FIG. 4, process flow 500 of FIG. 5, process flow 700 of FIG. 7, process flow 800 of FIG. 8, process flow 900 of FIG. 9, process flow 1000 of FIG. 10, process flow 1100 of FIG. 11, process flow 1200 of FIG. 12, process flow 1300 of FIG. 13, and/or process flow 1400 of FIG. 14.

Process flow 600 begins with 602, and moves to operation 604. Operation 604 depicts initializing a timer. This timer can measure an amount of time, after the expiration of which, a vote value is to be decremented, or faded. In this manner, vote values will gradually decrease over time, which can aid in throttling computer agents that are currently using the most computing resources. After operation 604, process flow 600 moves to operation 606.

Operation 606 depicts determining whether a timer has expired. This can comprise the timer of operation 604. Where in operation 606 it is determined that a timer has expired, process flow 600 moves to operation 608. Instead, where in operation 606 it is determined that a timer has not yet expired, process flow 600 loops back to operation 606.

Operation 608 is reached from operation 606 where it is determined that the timer has expired. Operation 608 depicts determining whether decrementing a vote value will cause the vote value to be less than or equal to zero. For example, if the vote value is 0.1 and decrementing a vote value involves subtracting 0.15, then it can be determined that decrementing a vote value will cause the vote value to be less than or equal to zero.

Where it is determined in operation 608 that decrementing the vote value will cause the vote value to be less than or equal to zero, process flow 600 moves to operation 610. Instead, where it is determined in operation 608 that decrementing the vote value will not cause the vote value to be less than or equal to zero, process flow 600 moves to operation 612.

Operation 610 is reached from operation 608 where it is determined that the vote value will cause the vote value to be less than or equal to zero. Operation 610 depicts setting the vote value to equal zero. This can comprise storing in the corresponding portion of votes 110 of FIG. 1 the value zero in place of the previously-stored value for that vote. After operation 610, process flow 600 moves to operation 604.

Operation 612 is reached from operation 608 where it is determined that the vote value will not cause the vote value to be less than or equal to zero. Operation 612 depicts decrementing the vote value. This can comprise subtracting a predetermined decrement value (e.g., 0.15) from the vote value and storing the result in the same location where the previous vote value was stored in votes 110 of FIG. 1. After operation 612, process flow 600 moves to operation 604.

In this manner, vote values can be faded—gradually reduced to zero—over time. This can be done so that current information about how much processing resources a particular computer agent is using can be considered in determining whether to throttle a computer agent. In some examples, process flow 600 (using one or more instances of the process flow) can be implemented for each of the vote values being maintained by automatic identification for throttling component 108 of FIG. 1.

FIG. 7 illustrates an example process flow 700 for throttling a computer agent that can facilitate automatic identification of computer agents for throttling, in accordance with certain embodiments of this disclosure. In some examples, one or more embodiments of process flow 700 can be implemented by automatic identification for throttling component 108 of FIG. 1, or computing environment 1500 of FIG. 15.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 800 of FIG. 8, process flow 900 of FIG. 9, process flow 1000 of FIG. 10, process flow 1100 of FIG. 11, process flow 1200 of FIG. 12, process flow 1300 of FIG. 13, and/or process flow 1400 of FIG. 14.

Process flow 700 begins with 702, and moves to operation 704. Operation 704 depicts selecting a computer agent. In some examples, automatic identification for throttling component 108 of FIG. 1 can maintain a list of computer agents that have registered with it, and operation 704 can comprise selecting a computer agent from this list that has not yet been selected in the current instance of process flow 700. After operation 704, process flow 700 moves to operation 706.

Operation 706 depicts determining whether the computer agent's vote value is above a predetermined threshold value. This predetermined threshold value can be one for which, computer agents that have a vote value above the predetermined threshold value will be throttled. Where it is determined in operation 706 that the computer agent's vote value is above a predetermined threshold value, process flow 700 moves to operation 708. Instead, where it is determined in operation 708 that the computer agent's vote value is not above a predetermined threshold value, process flow 700 moves to operation 710.

Operation 708 is reached from operation 706 where it is determined that the computer agent's vote value is above a predetermined threshold value. Operation 708 depicts throttling the computer agent. In some examples, throttling can include, among other techniques, instructing the computer agent to sleep longer between times when the computer agent is active, reducing a priority of the computer agent that a scheduler uses in making scheduling decisions, and/or comprise reducing an amount of time that the scheduler schedules the computer agent for using a processor. After operation 708, process flow 700 moves to operation 710.

Operation 710 is reached from operation 706 where it is determined that the computer agent's vote value is not above a predetermined threshold value, or from operation 708. Operation 710 depicts determining whether there is another computer agent. This can comprise analyzing the list of operation 704 to determine whether there is another agent that has not yet been selected in the present iteration of process flow 700.

Where it is determined in operation 710 that there is another computer agent, process flow 700 returns to operation 704. In this manner, loops of operations 704-710 can be performed to analyze each computer agent (for which a vote is being maintained) to determine whether to throttle that computer agent. Instead, where it is determined in operation 710 that there is not another computer agent, process flow 700 moves to 712, where process flow 700 ends.

FIG. 8 illustrates an example process flow 800 for throttling a computer agent with multiple degrees of severity that can facilitate automatic identification of computer agents for throttling, in accordance with certain embodiments of this disclosure. In some examples, one or more embodiments of process flow 800 can be implemented by automatic identification for throttling component 108 of FIG. 1, or computing environment 1500 of FIG. 15.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 900 of FIG. 9, process flow 1000 of FIG. 10, process flow 1100 of FIG. 11, process flow 1200 of FIG. 12, process flow 1300 of FIG. 13, and/or process flow 1400 of FIG. 14.

Process flow 800 begins with 802, and moves to operation 804. Operation 804 depicts determining a system status. The system status can correspond to how a user experiences interacting with the system. For example, the system status correlate to an amount of time to process a user's request to read a file. Different amounts of time to perform this function can correlate to different system statuses, with a healthy status corresponding to a faster time than a diminished 1 status (e.g., 6-8 milliseconds (ms) latency), and then relative to a diminished 2 status (>8 ms latency).

Where it is determined in operation 804 that the system status is healthy, process flow 800 moves to operation 806. Where it is determined in operation 804 that the system status is diminished 1, process flow 800 moves to operation 808. Where it is determined in operation 804 that the system status is diminished 2, process flow 800 moves to operation 810.

Operation 806 is reached from operation 804 where it is determined that the system status is healthy. Operation 806 depicts not throttling the computer agents. This can comprise making no changes to the performance of computer agents. In examples where some agents are being throttled this can comprise ceasing to throttle those agents. After operation 806, process flow 800 moves to 812, where process flow 800 ends.

Operation 808 is reached from operation 804 where it is determined that the system status is diminished 1. Operation 808 depicts throttling computer agents at level 1. Using an example where throttling comprises instructing a computer agent to sleep longer, this can comprise instruction the computer agents that are being throttled to sleep longer relative to an amount of time they sleep when the system status is healthy. After operation 808, process flow 800 moves to 812, where process flow 800 ends.

Operation 810 is reached from operation 804 where it is determined that the system status is diminished 2. Operation 810 depicts throttling computer agents at level 2. Using an example where throttling comprises instructing a computer agent to sleep longer, this can comprise instruction the computer agents that are being throttled to sleep longer relative to an amount of time they sleep when the system status is diminished 1. After operation 810, process flow 800 moves to 812, where process flow 800 ends.

FIG. 9 illustrates an example process flow 900 for throttling a computer agent's workload that can facilitate automatic identification of computer agents for throttling, in accordance with certain embodiments of this disclosure. In some examples, one or more embodiments of process flow 900 can be implemented by automatic identification for throttling component 108 of FIG. 1, or computing environment 1500 of FIG. 15.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, process flow 1000 of FIG. 10, process flow 1100 of FIG. 11, process flow 1200 of FIG. 12, process flow 1300 of FIG. 13, and/or process flow 1400 of FIG. 14.

Process flow 900 begins with 902, and moves to operation 904. Operation 904 depicts determining a computer agent to be throttled. This can be a computer agent that has a vote value that is above a predetermined threshold value, such as described with respect to operation 708 of FIG. 7. After operation 904, process flow 900 moves to operation 906.

Operation 906 depicts identifying other members of the computer agent's workload. A workload can comprise a group of multiple computer agents. In some examples, a workload can be defined by user input, and can group together like computer agents, such as those that use a same computational pathway (sometimes referred to as a code path) or that perform a same operation. Information indicating which computer agents belong to which workloads can be stored on a computer system, and then accessed by automatic identification for throttling component 108 of FIG. 1. After operation 906, process flow 900 moves to operation 908.

Operation 908 depicts throttling the computer agent and the other members of the computer agent's workload. In some examples, operation 908 can be implemented in a similar manner as operation 708 of FIG. 7 for each computer agent of the workload. After operation 908, process flow 900 moves to 910 where process flow 900 ends.

FIG. 10 illustrates an example process flow 1000 for attributing work to nodes that can facilitate automatic identification of computer agents for throttling, in accordance with certain embodiments of this disclosure. In some examples, one or more embodiments of process flow 1000 can be implemented by automatic identification for throttling component 108 of FIG. 1, or computing environment 1500 of FIG. 15.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, process flow 1100 of FIG. 11, process flow 1200 of FIG. 12, process flow 1300 of FIG. 13, and/or process flow 1400 of FIG. 14.

Process flow 1000 begins with 1002, and moves to operation 1004. Operation 1004 depicts determining a node and a phase of a computer agent. In some examples, a file can be stored across multiple nodes. So, multiple computing agents (e.g., one agent per node) can be responsible for performing one operation on the file, such as reading it.

Additionally, some operations can comprise multiple phases. For example, a FlexProtect operation can comprise multiple phases performed by one or more computer agents.

This situation can lead to an example where a file is referenced as being stored on a first node, but an agent on a second node is slowing down an operation on the file (and then, slowing down the operation in a particular phase—e.g., phase 3).

Operation 1004 can comprise determining a node and a phase that is consuming computing resources. After operation 1004, process flow 1000 moves to operation 1006.

Operation 1006 depicts throttling the computer agent on the determined node and at the determined phase. In some examples, operation 1006 can be implemented in a similar manner as operation 708 of FIG. 7, though for a particular node and a particular phase. After operation 1006, process flow 1000 moves to 1008, where process flow 1000 ends.

FIG. 11 illustrates an example process flow 1100 for per-agent throttling thresholds for automatic identification of computer agents for throttling, in accordance with certain embodiments of this disclosure. In some examples, one or more embodiments of process flow 1100 can be implemented by automatic identification for throttling component 108 of FIG. 1, or computing environment 1500 of FIG. 15.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, process flow 1200 of FIG. 12, process flow 1300 of FIG. 13, and/or process flow 1400 of FIG. 14.

Process flow 1100 begins with operation 1102 and moves to operation 1104. Operation 1104 depicts determining a computer-agent specific threshold for a computer agent. A computer process can have an impact value that can be used to affect whether the computer agent is throttled (where a higher impact value can reduce a chance of being throttled for a given amount of computing resources used). Process flow 400 generally relates to an example where a new vote value is scaled based on the computer agent's impact value. Process flow 1100 generally relates to an example where what is scaled based on the computer agent's impact value is the threshold for throttling.

In such examples, there can be a default predetermined threshold value for throttling, and this can be scaled by the computer agent's impact value, where a higher impact value raises the predetermined threshold value. In examples where computer agents are throttled where their vote value is greater than this predetermined threshold value, doing so can decrease the chances that the computer agent will be throttled.

This computer-agent specific threshold can then vary on a per agent basis. That is, different computer agents can have different threshold values for throttling. After operation 1104, process flow 1100 moves to operation 1106.

Operation 1106 depicts throttling the computer agent in response to determining that its vote value is above its computer-agent specific threshold. In some examples, operation 1106 can be implemented in a similar manner as operation 708 of FIG. 7, where a computer-agent specific threshold is used. After operation 1106, process flow 1100 moves to 1108, where process flow 1100 ends.

FIG. 12 illustrates an example process flow 1200 for automatic identification of computer agents for throttling, in accordance with certain embodiments of this disclosure. In some examples, one or more embodiments of process flow 1200 can be implemented by automatic identification for throttling component 108 of FIG. 1, or computing environment 1500 of FIG. 15.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, process flow 1100 of FIG. 11, process flow 1300 of FIG. 13, and/or process flow 1400 of FIG. 14.

Process flow 1200 begins with 1202, and moves to operation 1204. Operation 1204 depicts initializing a voting value for a first computer agent of a group of computer agents. This can comprise automatic identification for throttling component 108 of FIG. 1 initializing a vote in votes 120 for a particular computer agent. After operation 1204, process flow 1200 moves to operation 1206.

Operation 1206 depicts receiving an indication from the first computer agent that the first computer agent has completed processing a work item. In some examples, operation 1206 can be implemented in a similar manner as operation 304 of FIG. 3. After operation 1206, process flow 1200 moves to operation 1208.

Operation 1208 depicts determining processing resources consumed by the first computer agent while processing the work item. In some examples, operation 1208 can be implemented in a similar manner as operation 306 of FIG. 3. After operation 1208, process flow 1200 moves to operation 1210.

Operation 1210 depicts determining a numerical value for the processing resources. In some examples, operation 1210 can be implemented in a similar manner as operation 308 of FIG. 3.

In some examples, operation 1210 comprises combining a first value of a first processing resource of the processing resources and a second value of a second processing resource of the processing resources to determine the numerical value. That is, in some examples, multiple separate resource consumption metrics can be combined to determine a value for a vote.

In some examples, operation 1210 comprises, normalizing and weighing the first value and the second value before the combining of the first value and the second value. That is, these multiple separate resource consumption metrics can be normalized and/or weighted as part of determining the numerical value.

After operation 1210, process flow 1200 moves to operation 1212.

Operation 1212 depicts adding the numerical value to the voting value to produce an updated voting value. In some examples, operation 1212 can be implemented in a similar manner as operation 310 of FIG. 3.

In some examples, operation 1212 comprises periodically reducing the updated voting value by a defined amount according to a defined periodicity. In some examples, operation 1212 comprises halting the periodically reducing of the updated voting value in response to determining the updated voting value is zero. That is, a vote value can be faded over time, and in some examples is not faded to have a negative value.

In some examples, the numerical value comprises a group of numerical values, and the updated voting value comprises a corresponding group of updated voting values. That is, multiple votes can be maintained for a computer agent, such as via a n-dimensional data structure.

In some examples, operation 1212 comprises updating a first updated voting value of the group of updated voting values based on a first value of a first processing resource of the processing resources, updating a second updated voting value of the group of updated voting values based on a second value of a second processing resource of the processing resources. That is, each of these multiple vote values can be stored and updated separately.

After operation 1212, process flow 1200 moves to operation 1214.

Operation 1214 depicts, in response to determining that performance of a device, on which the first computer agent operated, has degraded past a first defined performance threshold, throttling performance of members of the group of computer agents for which respective voting values are above a second defined threshold. That is, when automatic identification for throttling component 108 of FIG. 1 determines to throttle one or more computer agents, automatic identification for throttling component 108 can select those agents for throttling who have a respective vote value that is above a predetermined threshold value.

In some examples, a subgroup of the members of the group of computer agents is throttled. That is, in some examples, some but not all computer agents are throttled. This can be distinguished from some embodiments of processor throttling, where every process that executes on the processor receives fewer processor cycles in a given amount of time.

After operation 1214, process flow 1200 moves to 1216 where process flow 1200 ends.

FIG. 13 illustrates another example process flow 1300 for automatic identification of computer agents for throttling, in accordance with certain embodiments of this disclosure. In some examples, one or more embodiments of process flow 1300 can be implemented by automatic identification for throttling component 108 of FIG. 1, or computing environment 1500 of FIG. 15.

It can be appreciated that the operating procedures of process flow 1300 are example operating procedures, and that there can be embodiments that implement more or fewer operating procedures than are depicted, or that implement the depicted operating procedures in a different order than as depicted. In some examples, process flow 1300 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, process flow 1100 of FIG. 11, process flow 1200 of FIG. 12, and/or process flow 1400 of FIG. 14.

Process flow 1300 begins with 1302, and moves to operation 1304. Operation 1304 depicts receiving, from a first computer agent of a group of computer agents, an indication that a work item has completed processing. In some examples, operation 1304 can be implemented in a similar manner as operation 1206 of FIG. 12.

In some examples a first amount or a first type of work is defined for work items of the first computer agent, wherein a second amount or a second type of work is defined for work items of a second computer agent of the group of computer agents, and wherein the first amount of work and the first type of work differ from the second amount of work and the second type of work, respectively. That is, different computer agents can utilize different measurements of what constitutes a work item.

After operation 1304, process flow 1300 moves to operation 1306.

Operation 1306 depicts determining resources consumed by the first computer agent during the processing of the work item. In some examples, operation 1306 can be implemented in a similar manner as operation 1208 of FIG. 12.

After operation 1306, process flow 1300 moves to operation 1308.

Operation 1308 depicts determining a numerical value for the resources. In some examples, operation 1308 can be implemented in a similar manner as operation 1210 of FIG. 12.

After operation 1308, process flow 1300 moves to operation 1310.

Operation 1310 depicts adding the numerical value to a voting value for the first computer agent to produce an updated voting value. In some examples, operation 1310 can be implemented in a similar manner as operation 1212 of FIG. 12.

After operation 1310, process flow 1300 moves to operation 1312.

Operation 1312 depicts, in response to determining that a performance of a device, on which the first computer agent operated, has degraded beyond a first predetermined performance threshold, throttling performance of members of the group of computer agents with respective voting values above a second predetermined threshold. In some examples, operation 1312 can be implemented in a similar manner as operation 1214 of FIG. 12.

In some examples, operation 1312 comprises instructing a second computer agent, of the group of computer agents and that is being throttled according to the throttling, to increase an amount of time for which the second computer agent sleeps, lowering a priority of the second computer agent, or reducing an amount of processor time for the second computer agent. That is, throttling a computer agent can be implemented in different ways. Throttling can be implemented by instructing the computer agent to extend an amount of time that the computer agent sleeps between bouts of utilizing computing resources. Throttling can be implemented by lowering a priority of the computer agent to a scheduler that schedules the computer agent to use computing resources. Throttling can be implemented by reducing an amount of time for which the computing agent is scheduled to use computing resources.

In some examples, the group of computer agents comprises a first subgroup of computer agents that are not subject to throttling and a second subgroup of computer agents that are subject to throttling. In such examples, operation 1312 can comprise throttling the performance of the members of the second subgroup of computer agents. That is, computer agents can be divided into two general categories—computer agents that are eligible to be throttled, and computer agents that are not eligible to be throttled by automatic identification for throttling component 108 of FIG. 1.

In some examples, a first computer agent belongs to a workload group, wherein the workload group comprises a plurality of members. In such examples, operation 1312 can comprise throttling the plurality of members of the workload group based on the first computer agent being part of the members being throttled by the throttling of the performance of the members. In some examples, throttling of the plurality of members of the workload group comprises throttling a first member of the plurality of members of the workload group having a respective voting value below the second predetermined threshold. That is, a computer agent can be part of a workload, and throttling the computer agent can comprise also throttling the other computer agents of that workload. These other computer agents of a workload can be throttled even where they do not individually have a respective vote value that is above a predetermined threshold value for throttling.

After operation 1312, process flow 1300 moves to 1314, where process flow 1300 ends.

FIG. 14 illustrates another example process flow 1400 for automatic identification of computer agents for throttling, in accordance with certain embodiments of this disclosure. In some examples, one or more embodiments of process flow 1400 can be implemented by automatic identification for throttling component 108 of FIG. 1, or computing environment 1500 of FIG. 15.

It can be appreciated that the operating procedures of process flow 1400 are example operating procedures, and that there can be embodiments that implement more or fewer operating procedures than are depicted, or that implement the depicted operating procedures in a different order than as depicted. In some examples, process flow 1400 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, process flow 1100 of FIG. 11, process flow 1200 of FIG. 12, and/or process flow 1300 of FIG. 13.

Process flow 1400 begins with 1402, and moves to operation 1404. Operation 1404 depicts receiving an indication of completing processing of a task from a computer agent of a group of computer agents. In some examples, operation 1404 can be implemented in a similar manner as operation 1206 of FIG. 12.

In some examples, each computer agent of the group of computer agents is registered with a computer component, wherein each computer agent of the group of computer agents notifies the computer component of completing respective processing tasks, and wherein the computer component maintains a respective voting value for each computer agent of the group of computer agents. That is, each computer agent can initially register with automatic identification for throttling component 108 of FIG. 1, which maintains a respective vote for each computer agent. This can be implemented in a similar manner as process flow 200 of FIG. 2.

After operation 1404, process flow 1400 moves to operation 1406.

Operation 1406 depicts determining computing resources by the computer agent in the course of the processing of the task. In some examples, operation 1406 can be implemented in a similar manner as operation 1208 of FIG. 12.

After operation 1406, process flow 1400 moves to operation 1408.

Operation 1408 depicts adding a numerical value that corresponds to the computing resources to a voting value for the computer agent to produce an updated voting value. In some examples, operation 1408 can be implemented in a similar manner as operations 1210-1212 of FIG. 12.

After operation 1408, process flow 1400 moves to operation 1410.

Operation 1410 depicts, in response to determining that performance of a computer, with respect to which the computer agent operated, has degraded according to a degradation function based on a performance threshold, and, in further response to determining that the updated voting value satisfies a voting function based on a voting threshold, throttling performance of the computer agent. In some examples, operation 1410 can be implemented in a similar manner as operation 1214 of FIG. 12.

In some examples, the computer agent has an impact rating, and operation 1408 comprises modifying the numerical value inversely proportional to a value of the impact rating. That is, voting can be based on a computer agent's impact value. For example, as the computer agent's impact value increases, a vote value that computer agent receives for consuming a given amount of computing resources decreases.

In some examples, operation 1410 comprises throttling each computer agent of the group of computer agents determined to have a respective voting value that satisfies the voting function. That is, in some examples, all computer agents with a respective vote value that is above a predetermined threshold value are throttled.

In some examples, operation 1410 comprises using machine learning techniques to determine the voting threshold.

In some examples, operation 1410 comprises decreasing a first priority of a thread associated with the computer agent or decreasing a second priority of a process associated with the computer agent.

After operation 1410, process flow 1400 moves to 1412 where process flow 1400 ends.

Example Operating Environment

In order to provide additional context for various embodiments described herein, FIG. 15 and the following discussion are intended to provide a brief, general description of a suitable computing environment 1500 in which the various embodiments of the embodiment described herein can be implemented.

For example, parts of computing environment 1500 can be used to implement one or more embodiments of client computer 102, computer system 106, automatic identification for throttling component 108, node A 116A, node B 116B, and/or node C 116C of FIG. 1. In some examples, computing environment 1500 can implement one or more embodiments of the process flows of FIGS. 2-14 to facilitate automatic identification of computer agents for throttling.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and an optical disk drive 1520 (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are examples and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
initializing a voting value for a first computer agent of a group of computer agents;
receiving an indication from the first computer agent that the first computer agent has completed processing a work item;
determining processing resources consumed by the first computer agent while processing the work item;
determining a numerical value for the processing resources;
adding the numerical value to the voting value to produce an updated voting value; and
in response to determining that performance of a device, on which the first computer agent operated, has degraded past a first defined performance threshold, throttling performance of members of the group of computer agents for which respective voting values are above a second defined threshold, wherein the throttling of the performance of the members of the group of computer agents comprises decreasing a first priority of a thread associated with the members of the group of computer agents or decreasing a second priority of a process associated with the members of the group of computer agents.

2. The system of claim 1, wherein a subgroup of the members of the group of computer agents is throttled.

3. The system of claim 1, wherein the operations further comprise:
periodically reducing the updated voting value by a defined amount according to a defined periodicity.

4. The system of claim 3, wherein the operations further comprise:
halting the periodically reducing of the updated voting value in response to determining the updated voting value is zero.

5. The system of claim 1, wherein the determining of the numerical value for the processing resources comprises:
combining a first value of a first processing resource of the processing resources and a second value of a second processing resource of the processing resources to determine the numerical value.

6. The system of claim 5, wherein the operations further comprise:
normalizing and weighing the first value and the second value before the combining of the first value and the second value.

7. The system of claim 1, wherein the numerical value comprises a group of numerical values, and the updated voting value comprises a corresponding group of updated voting values.

8. The system of claim 7, wherein the operations further comprise:
updating a first updated voting value of the group of updated voting values based on a first value of a first processing resource of the processing resources; and
updating a second updated voting value of the group of updated voting values based on a second value of a second processing resource of the processing resources.

9. A method, comprising:
receiving, from a first computer agent of a group of computer agents by a system comprising a processor, an indication that a work item has completed processing;
determining, by the system, resources consumed by the first computer agent during the processing of the work item;
determining, by the system, a numerical value for the resources;
adding, by the system, the numerical value to a voting value for the first computer agent to produce an updated voting value; and
in response to determining that a performance of a device, on which the first computer agent operated, has degraded beyond a first predetermined performance threshold, throttling, by the system, performance of members of the group of computer agents with respective voting values above a second predetermined threshold, wherein the throttling of the performance of the members of the group of computer agents comprises at least one of decreasing a first priority of a thread associated with the members of the group of computer agents or decreasing a second priority of a process associated with the members of the group of computer agents.

10. The method of claim 9, wherein a first amount or a first type of work is defined for work items of the first computer agent, wherein a second amount or a second type of work is defined for work items of a second computer agent of the group of computer agents, and wherein the first amount of work and the first type of work differ from the second amount of work and the second type of work, respectively.

11. The method of claim 9, wherein the throttling of the performance of the members of the group of computer agents comprises:
instructing a second computer agent, of the group of computer agents and that is being throttled according to the throttling, to increase an amount of time for which the second computer agent sleeps, lowering a priority of the second computer agent, or reducing an amount of processor time for the second computer agent.

12. The method of claim 9, wherein the group of computer agents comprises a first subgroup of computer agents that are not subject to throttling and a second subgroup of computer agents that are subject to throttling, and wherein the throttling of the performance of the members of the group of computer agents comprises:
throttling the performance of the members of the second subgroup of computer agents.

13. The method of claim 9, wherein the first computer agent belongs to a workload group, wherein the workload group comprises a group of members, and further comprising:
throttling, by the system, the group of members of the workload group based on the first computer agent being part of the members being throttled by the throttling of the performance of the members.

14. The method of claim 13, wherein the throttling of the group of members of the workload group comprises:
throttling a first member of the group of members of the workload group having a respective voting value below the second predetermined threshold.

15. A non-transitory computer-readable medium comprising instructions that, in response to execution, cause a system comprising a processor to perform operations, comprising:
- receiving an indication of completing processing of a task from a computer agent of a group of computer agents;
- determining computing resources by the computer agent in the course of the processing of the task;
- adding a numerical value that corresponds to the computing resources to a voting value for the computer agent to produce an updated voting value; and
- in response to determining that performance of a computer, with respect to which the computer agent operated, has degraded according to a degradation function based on a performance threshold, and, in further response to determining that the updated voting value satisfies a voting function based on a voting threshold, throttling performance of the computer agent, wherein the throttling of the performance of the computer agent comprises at least one of decreasing a first priority of a thread associated with the computer agent or decreasing a second priority of a process associated with the computer agent.

16. The non-transitory computer-readable medium of claim 15, wherein the computer agent has an impact rating, and wherein the adding of the numerical value to the voting value for the computer agent to produce the updated voting value comprises:
- modifying the numerical value inversely proportional to a value of the impact rating.

17. The non-transitory computer-readable medium of claim 15, wherein the throttling of the performance of the computer agent comprises:
- throttling each computer agent of the group of computer agents determined to have a respective voting value that satisfies the voting function.

18. The non-transitory computer-readable medium of claim 15, wherein each computer agent of the group of computer agents is registered with a computer component, wherein each computer agent of the group of computer agents notifies the computer component of completing respective processing tasks, and wherein the computer component maintains a respective voting value for each computer agent of the group of computer agents.

19. The non-transitory computer-readable medium of claim 15, wherein the operations further comprise:
- using a model generated based on machine learning to determine the voting threshold.

20. The non-transitory computer-readable medium of claim 15, wherein a subgroup of the members of the group of computer agents is throttled.

* * * * *